United States Patent
Hirao et al.

(10) Patent No.: US 7,156,524 B2
(45) Date of Patent: Jan. 2, 2007

(54) PROJECTION TYPE VIDEO DISPLAY AND METHOD OF ADJUSTING THE SAME AT FACTORY SHIPPING

(75) Inventors: Yoshichika Hirao, Osaka (JP); Naoki Kaise, Osaka (JP); Kenji Hyakutake, Chiba (JP)

(73) Assignee: Sanyo Electric Co., Ltd., Osaka (JP)

( * ) Notice: Subject to any disclaimer, the term of this patent is extended or adjusted under 35 U.S.C. 154(b) by 249 days.

(21) Appl. No.: 10/891,497

(22) Filed: Jul. 15, 2004

(65) Prior Publication Data
US 2005/0030488 A1 Feb. 10, 2005

(30) Foreign Application Priority Data
Jul. 17, 2003 (JP) ............... 2003-276036
Jul. 17, 2003 (JP) ............... 2003-276037

(51) Int. Cl.
G03B 21/14 (2006.01)
G03B 3/00 (2006.01)
H04N 3/23 (2006.01)
H04N 3/223 (2006.01)
H04N 3/227 (2006.01)

(52) U.S. Cl. ............... 353/70; 353/69; 353/101; 348/746; 348/747; 345/647

(58) Field of Classification Search ............... 353/101, 353/69, 70; 348/739, 744, 745, 746, 747; 349/7, 9; 345/647
See application file for complete search history.

(56) References Cited

U.S. PATENT DOCUMENTS 6,416,185 B1 * 7/2002 Smith ............... 353/69
2004/0070694 A1 * 4/2004 Haruna et al. ............... 348/745

FOREIGN PATENT DOCUMENTS

| JP | 2002-213946 | 7/2002 |
| JP | 2003-57531 | 2/2003 |
| JP | 2003-78842 | 3/2003 |

* cited by examiner

Primary Examiner—W. B. Perkey
Assistant Examiner—Rochelle Blackman
(74) Attorney, Agent, or Firm—Westerman, Hattori, Daniels & Adrian, LLP.

(57) ABSTRACT

A microcomputer performs image drawing processing of a projection video for adjustment by an OSD (On-Screen Display) circuit when it detects the press of an adjustment command key. The projection video for adjustment is an image having a black-and-white area high in contrast formed therein. The projection video for adjustment is picked up by a CCD line sensor in a sensor. A microcomputer has its input an image pick-up signal from the CCD line sensor, to make focusing adjustment and trapezoidal distortion correction on the basis of the image pick-up signal.

9 Claims, 4 Drawing Sheets

PROJECTION TYPE VIDEO DISPLAY AND METHOD OF ADJUSTING THE SAME AT FACTORY SHIPPING

BACKGROUND OF THE INVENTION

Field of the Invention

The present invention relates to a projection type video display such as a liquid crystal projector.

Examples of the contents of adjustment of setting at the time of projection of a projection type video display include focusing adjustment and trapezoidal distortion correction of a projection video (see JP-A-2003-78842). Conventionally, a video has been actually projected in the case of such adjustment. In this case, the video has been projected using a video signal inputted from an external device.

SUMMARY OF THE INVENTION

If focusing adjustment and trapezoidal distortion correction can be made without depending on an input of external video, however, a projection type video display is superior in convenience.

In view of the foregoing circumstances, an object of the present invention is to provide a projection type video display capable of making focusing adjustment and trapezoidal distortion correction without depending on an input of external video.

In order to solve the above-mentioned problem, in a projection type video display that optically modulates light emitted from a light source by a light valve and projects a video, a projection type video display according to the present invention is characterized by comprising a sensor comprising image pick-up means for picking up a projection video; means for making focusing adjustment on the basis of an output of the sensor; means for making trapezoidal distortion correction on the basis of the output of the sensor; and image drawing means for drawing an image used as the projection video by itself, and wherein a projection video for adjustment utilized for the focusing adjustment and the trapezoidal distortion correction is produced by the image drawing means.

In the above-mentioned configuration, the projection video for adjustment utilized for the focusing adjustment and the trapezoidal distortion correction is produced by the image drawing means for drawing the image used as the projection video by itself, thereby eliminating the necessity of an external input (an external device) for feeding the projection video for adjustment, to allow such adjustment or the like to be easily and rapidly made.

The image drawing means may be an on-screen display circuit.

An image having a black-and-white area formed therein may be drawn as the projection video for adjustment.

Examples of the trapezoidal distortion correction include longitudinal trapezoidal distortion correction and lateral trapezoidal distortion correction, and the realization of accurate correction is required with respect to each of the corrections.

Another object of the present invention is to provide a projection type video display capable of properly making both longitudinal trapezoidal distortion correction and lateral trapezoidal distortion correction and a method of adjusting the projection type video display at factory shipping.

In order to solve the above-mentioned problem, in a projection type video display that optically modulates light emitted from a light source by a light valve and projects an enlarged video by a projection lens, a projection type video display according to the present invention is characterized by comprising a sensor comprising image pick-up means for picking up a projection video; means for making focusing adjustment on the basis of an output of the sensor; means for successively producing at least a first projection video for adjustment utilized for longitudinal trapezoidal distortion correction and a second projection video for adjustment utilized for lateral trapezoidal distortion correction; means for acquiring first information used for longitudinal trapezoidal distortion correction on the basis of the output of the sensor which is projecting the first projection video for adjustment and acquiring second information used for the lateral trapezoidal distortion correction on the basis of the output of the sensor which is projecting the second projection video for adjustment; and means for making trapezoidal distortion correction on the basis of the first information and the second information.

In the above-mentioned configuration, the projection video for adjustment for the longitudinal trapezoidal distortion correction and the projection video for adjustment for the lateral trapezoidal distortion correction are separately (successively) projected, to acquire by the sensor information respectively required therefor, thereby making it possible to realize accurate correction with respect to each of the longitudinal trapezoidal distortion correction and the lateral trapezoidal distortion correction.

The first information may be angle information relating to a vertical component of an angle formed at an intersection between a plane perpendicular to a projection optical axis and a projection surface, and the second information may be angle information relating to a horizontal component of the angle formed at the intersection between the plane perpendicular to the projection optical axis and the projection surface.

The first projection video for adjustment utilized for the longitudinal trapezoidal distortion correction may be a striped video having white horizontal line areas and black horizontal line areas alternately formed therein, and the second projection video for adjustment utilized for the lateral trapezoidal distortion correction may be a striped video having white vertical line areas and black vertical line areas alternately formed therein.

The sensor may be attached to a front cover of the video display, and the projection lens may be attached to a chassis.

The projection type video display may comprise a memory storing a first offset value for the longitudinal trapezoidal distortion correction and a second offset value for the lateral trapezoidal distortion correction, which are obtained by examination at factory shipping, and may be so configured that adjustment by the offset values is used in making the actual trapezoidal distortion correction.

A method of adjusting the projection type video display according to the present invention at factory shipping is characterized by comprising the steps of setting the arrangement relationship between the projection type video display and a screen in which no trapezoidal distortion is induced; storing first information obtained when the first projection video for adjustment is projected as a first offset value in the memory; and storing second information obtained when the second projection video for adjustment is projected as a second offset value in the memory.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (Embodiment 1)

A liquid crystal projector according to an embodiment 1 of the present invention will be described on the basis of the drawings.

Figure 1:
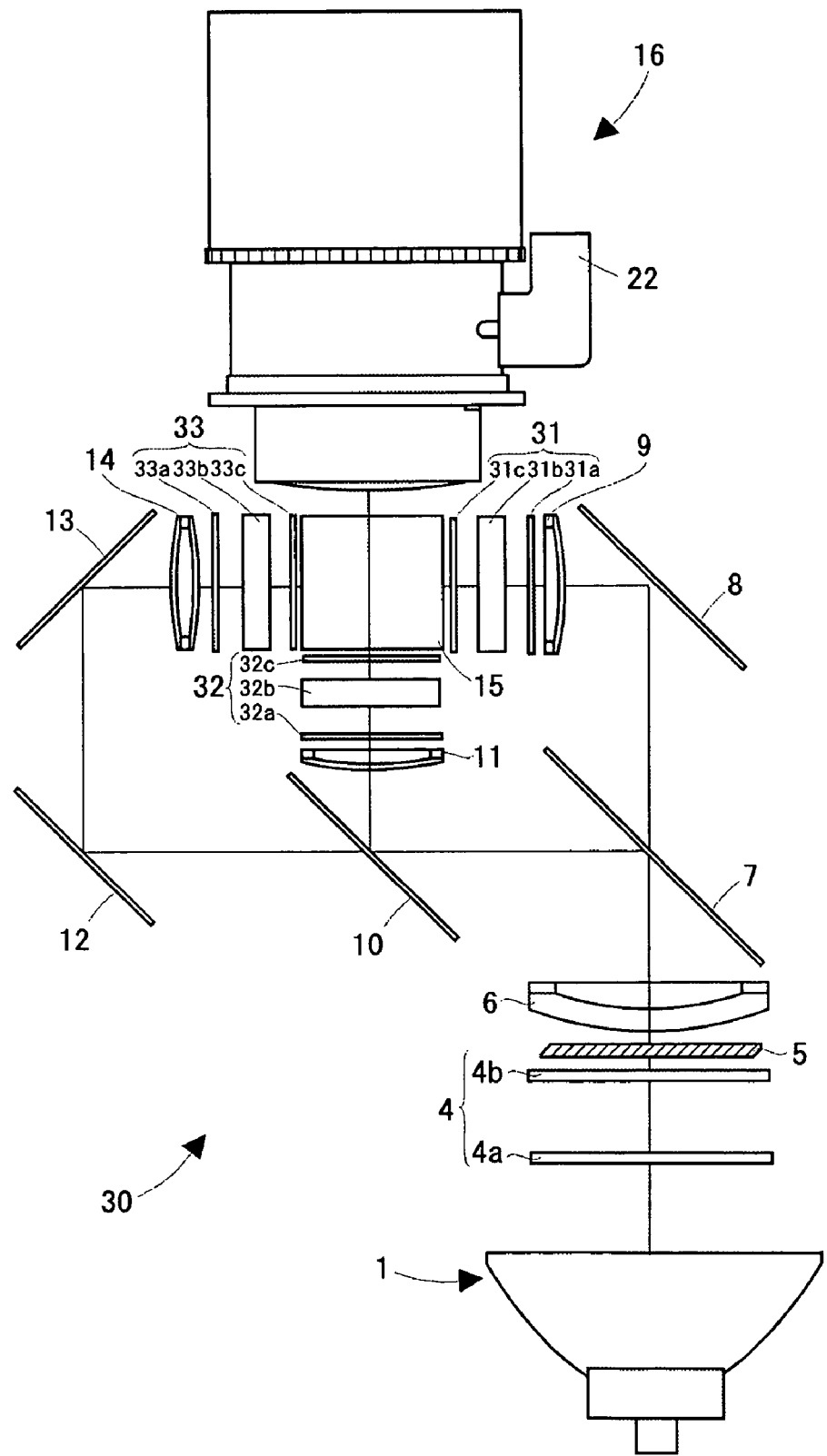
FIG. 1 is a diagram showing the configuration of an optical system of a liquid crystal projector according to an embodiment of the present invention.

FIG. 1 is a diagram showing a three-panel liquid crystal projector 30 according to the present embodiment. A light emitting portion in a light source 1 is composed of a ultra-high pressure mercury lamp, a metal halide lamp, a xenon lamp, or the like, and its irradiated light is emitted after being changed into parallel lights by a parabolic reflector, and is introduced into an integrator lens 4.

The integrator lens 4 is composed of a pair of groups of lenses (fly's eye lenses) 4a and 4b, and lens portions composing each of the fly's eye lenses introduces the light emitted from the light source 1 into the whole surface of a liquid crystal light valve, described later, to average partial non-uniformity in luminance which exists in the light source 1 and reduce the difference between light amounts at the center and the periphery of a screen. The light which has passed through the integrator lens 4 is introduced into a first dichroic mirror 7 after passing through a polarization conversion system 5 and a condenser lens 6.

The polarization conversion system 5 is composed of a polarization beam splitter array (hereinafter referred to as a PBS array). The PBS array comprises polarized light separating surfaces and retardation plates (½ λ plates). Each of the polarized light separating surfaces in the PBS array passes P-polarized light and changes an optical path of S-polarized light by 90 degrees, for example, of lights from the integrator lens 4. The S-polarized light whose optical path has been changed is reflected on the adjacent polarized light separating surface and is emitted as it is. On the other hand, the P-polarized light which has passed through the polarized light separating surface is emitted after being converted into S-polarized light by the retardation plate provided on the front side (on the light exit side). That is, nearly all the lights are converted into S-polarized lights in this case.

The first dichroic mirror 7 transmits light in a red wavelength band and reflects light in a cyan (green+blue) wavelength band. The light in the red wavelength band which has passed through the first dichroic mirror 7 is reflected on a reflecting mirror 8 so that its optical path is changed. The red light reflected on the reflecting mirror 8 is optically modulated by passing through a transmission type liquid crystal light valve for red light 31 through a lens 9. On the other hand, the light in the cyan wavelength band which has been reflected on the first dichroic mirror 7 is introduced into a second dichroic mirror 10.

The second dichroic mirror 10 transmits light in a blue wavelength band and reflects light in a green wavelength band. The light in the green wavelength band which has been reflected on the second dichroic mirror 10 is introduced into a transmission type liquid crystal light valve for green light 32 through a lens 11, and is optically modulated by passing through the liquid crystal light valve 32. The light in the blue wavelength band which has passed through the second dichroic mirror 10 is introduced into the transmission type liquid crystal light valve for blue light 33 through a total reflection mirror 12, a total reflection mirror 13, and a lens 14, and is optically modulated by passing through the liquid crystal light valve 33.

The liquid crystal light valves 31, 32, and 33 respectively comprise incidence-side light polarizing plates 31a, 32a, and 33a, panels 31b, 32b, and 33b constructed by sealing a liquid crystal between a pair of glass boards (having a pixel electrode and an alignment film formed therein), and output side light polarizing plates 31c, 32c, and 33c.

Figure 4A:
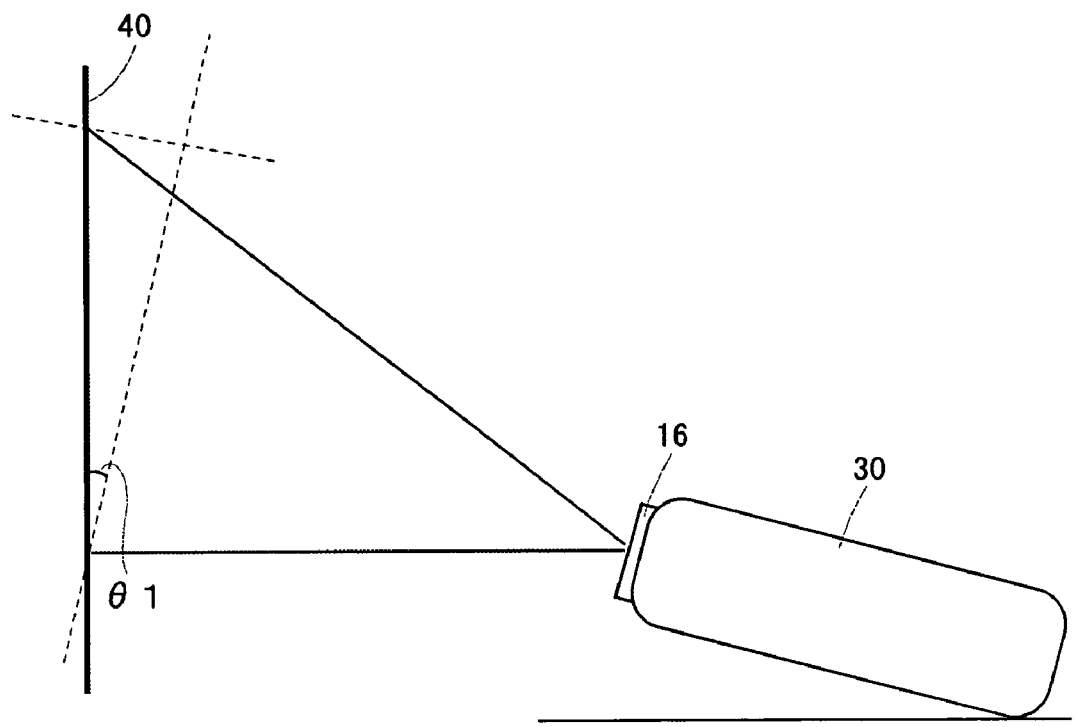
FIG. 4A is an explanatory view showing how longitudinal trapezoidal distortion is induced.
Figure 4B:
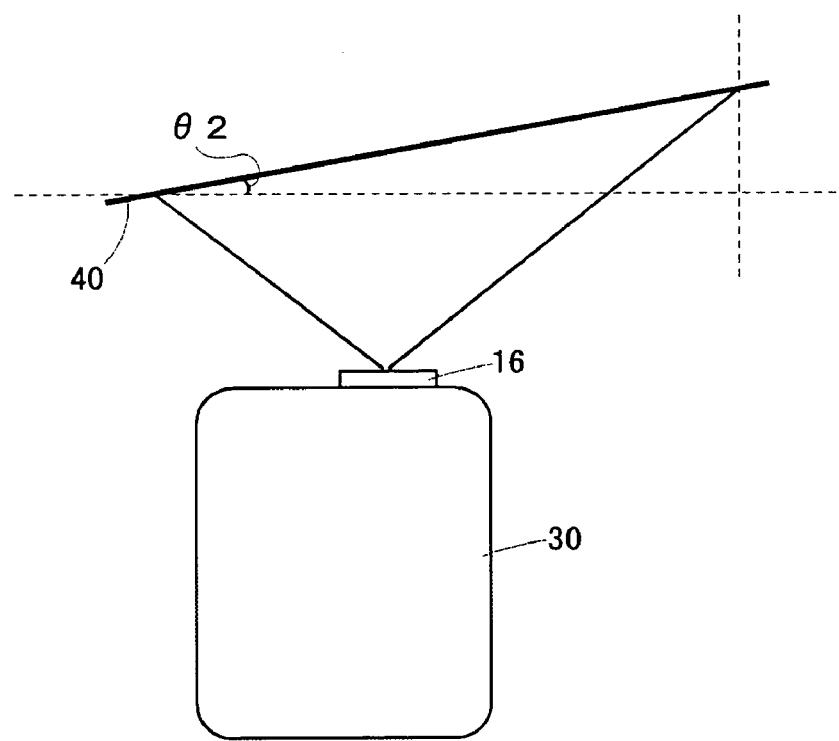
FIG. 4B is an explanatory view showing how lateral trapezoidal distortion is induced.

The lights (video lights in respective colors) which have been modulated by respectively passing through the liquid crystal light valves 31, 32, and 33 are mixed by a cross dichroic prism 15, to be a full color video light. The full color video light is enlarged and projected by a projection lens 16, and is displayed on a screen 40 (see FIG. 4)

The projection lens 16 comprises a focusing motor (a lens driving motor) 22 for focusing adjustment. The lens is moved in a pull-out direction when a pull-out direction driving signal is fed to a focusing motor 22 from a microcomputer 25, described later, while being driven in a pull-in direction when a pull-in direction driving signal is fed to the focusing motor 22.

An adjuster for angle-of-elevation adjustment is provided on a lower surface of a frame of the liquid crystal projector 30. The projection lens 16 is attached to a main body chassis, and a sensor 29, described later, is attached to a front cover.

Figure 2:
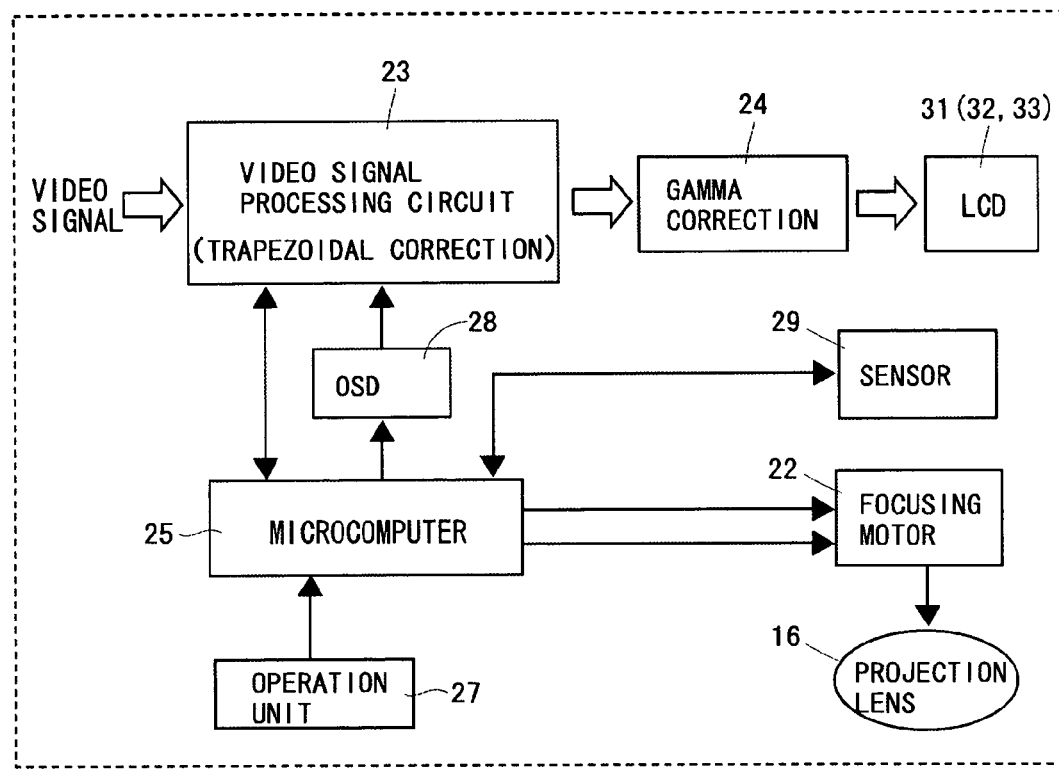
FIG. 2 is a block diagram showing an electrical circuit system of a liquid crystal projector.

FIG. 2 is block diagram showing the outline of an electrical system of the liquid crystal projector 30. A video signal processing circuit 23 inputs a video signal to perform processing such as frequency conversion (conversion of the number of scanning lines) as well as processing such as image processing serving as trapezoidal distortion correction on the basis of a command from the microcomputer 25. A gamma correction circuit 24 performs correction processing in view of applied voltage/optical transmission characteristics of a liquid crystal light valve (LCD), and feeds a video signal (video data) after the correction to the liquid crystal light valve (drives the liquid crystal light valve)

An operation unit (or a remote control transmitter) 27 is provided with keys for various types of operations. In the present embodiment, the keys include an adjustment command key for commanding that focusing adjustment and trapezoidal distortion correction should be made.

An OSD (On-Screen Display) circuit 28 performs processing for generating video data based on character information and figure information which the microcomputer 25 is instructed to output and incorporating the video data into input video data.

Figure 3:
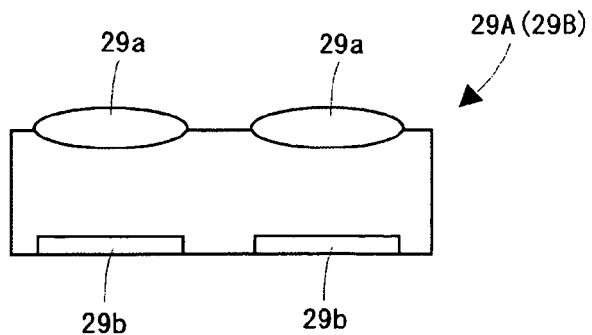
FIG. 3 is a diagram showing the schematic configuration of a sensor.

The sensor 29 comprises a first sensor portion 29A and a second sensor portion 29B. Each of the sensor portions 29A (29B) comprises two lenses 29a and CCD line sensors 29b respectively provided in correspondence with the lenses 29a, as shown in FIG. 3. The CCD line sensor 29b is formed so as to extend in the direction in which the lenses 29a are arranged. As the sensor portion 29A (29B), sensors disclosed in JP-A-2002-213946 and JP-A-2003-57531 can be utilized.

The first sensor portion 29A is arranged such that the lenses 29a are arranged in the vertical direction, and the second sensor portion 29B is arranged such that the lenses 29a are arranged in the horizontal direction.

The microcomputer 25 samples an image pick-up signal of the sensor 29 to generate image pick-up data, to calculate contrast data and angle data. The contrast data is a signal representing the degree of a high-frequency component on the image pick-up signal outputted by the CCD line sensor 29b, and indicates that the higher the degree of the high-frequency component on the image pick-up signal is, the better the lenses are in focus. Further, the angle data includes first angle data $\theta 1$ (see FIG. 4A) representing the degree of longitudinal trapezoidal distortion obtained by the first sensor portion 29A and second angle data $\theta 2$ (see FIG. 4B) representing the degree of lateral trapezoidal distortion obtained by the second sensor portion 29B.

The angle data can be obtained by arithmetic processing based on the results of measurement of the distance from the sensor 29 to a projection video for adjustment (the screen 40). The distance is measured by so-called triangular surveying, and can be found from the relative shift (a phase difference) of a video picked up on each of the CCD line sensors 29b in the sensor portion 29A (29B), the focal length of the lenses, and the distance between the lenses. The distance measurement can be made for each of a plurality of areas in a range where the projection video for adjustment is picked up. That is, a range of imaging of the CCD line sensor 29b is divided into a plurality of areas, and the results of the distance measurement can be calculated for each of the areas. For example, the distance measurement is made with respect to the uppermost area and the lowermost area (the leftmost area and the rightmost area) of the projection video for adjustment. The difference in the measured distance value between the uppermost area and the lowermost area (the leftmost area and the rightmost area) is a large value corresponding to the degree of non-perpendicularity between a projection optical axis and the screen. An arctangent is found from the differences between the distance between the uppermost area and the lowest area (the left most area and the right most area) and the measured distance value, thereby allowing the angle data ($\theta 1$, $\theta 2$) to be calculated.

The microcomputer 25 carries out overall control in the liquid crystal projector 30. Adjustment control of setting at the time of projection, described later, is carried out particularly as control according to the present invention by the microcomputer 25.

A user does not press the adjustment command key in the operation unit 27 until the light source enters a sufficiently luminescent state after the power supply is turned on. The microcomputer 25 performs image drawing processing of the projection video for adjustment by the OSD circuit 28 when it detects the press of the adjustment command key. An image having a black-and-white area high in contrast formed therein may be used as the projection video for adjustment. The microcomputer 25 feeds the pull-out direction driving signal to the focusing motor 22, and samples the image pick-up signal of the sensor 29, to generate contrast data.

The microcomputer 25 starts a timer when it starts the above-mentioned sampling, and generates the contrast data at predetermined time intervals and stores the generated contrast data in a memory (not shown) The microcomputer 25 judges the best contrast data, to acquire time information (in-focus lens position information) in a case where the contrast data is obtained. The microcomputer 25 feeds the pull-in direction driving signal to the focusing motor 22 by a time period obtained by subtracting the time information from the whole time period during which it feeds the pull-out direction driving signal to the focusing motor 22. Focusing adjustment is thus realized.

Furthermore, the microcomputer 25 makes trapezoidal distortion correction on the basis of image pick-up data of the sensor 29. Examples of the trapezoidal distortion include longitudinal trapezoidal distortion and lateral trapezoidal distortion. First, in a first projection video for adjustment shown in FIG. 5A, processing for acquiring the angle data $\theta 1$ for the longitudinal trapezoidal distortion correction is performed. That is, the microcomputer 25 employs an output of the first sensor portion 29A, makes distance measurement with respect to each of the uppermost area and the lowermost area of the projection video for adjustment, and calculates the angle data $\theta 1$ from the differences between the distance between the uppermost area and the lowermost area and the measured distance value. The microcomputer 25 then performs image drawing processing of a second projection video for adjustment by the OSD circuit 28. The second projection video for adjustment is a striped image having white vertical line areas and black vertical line areas alternately formed therein, as shown in FIG. 5B. The microcomputer 25 employs an output of the second sensor portion 29B, makes distance measurement with respect to each of the leftmost area and the rightmost area of the projection video for adjustment, and calculates the angle data $\theta 2$ from the differences between the distance between the uppermost area and the lowermost area and the measured distance value.

Figure 5A:
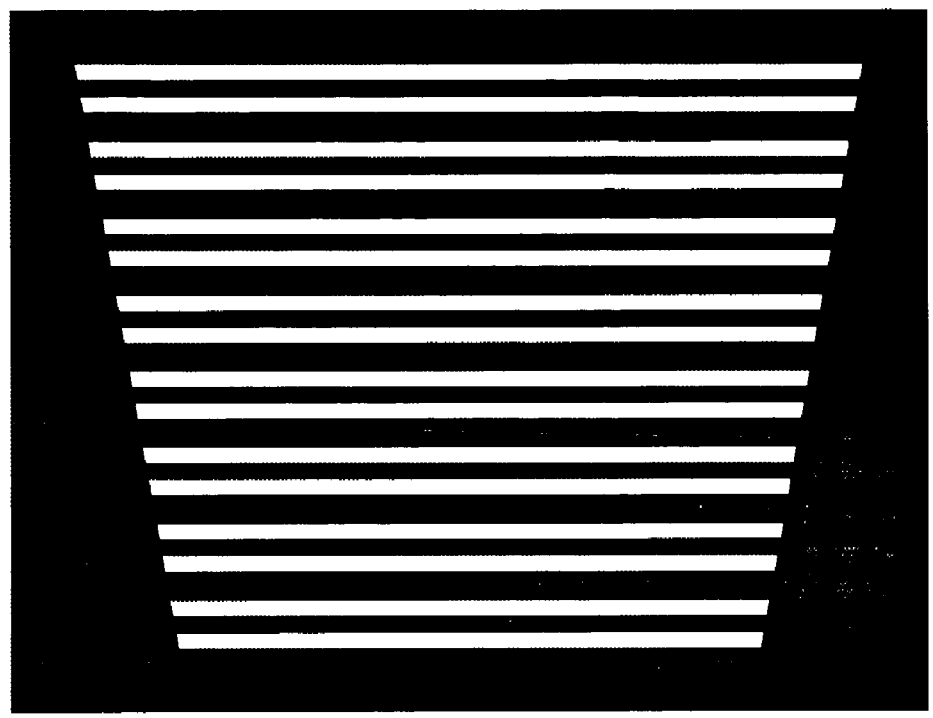
FIG. 5A is an explanatory view showing that longitudinal trapezoidal distortion is induced in a first projection video for adjustment projected on a screen.
Figure 5B:
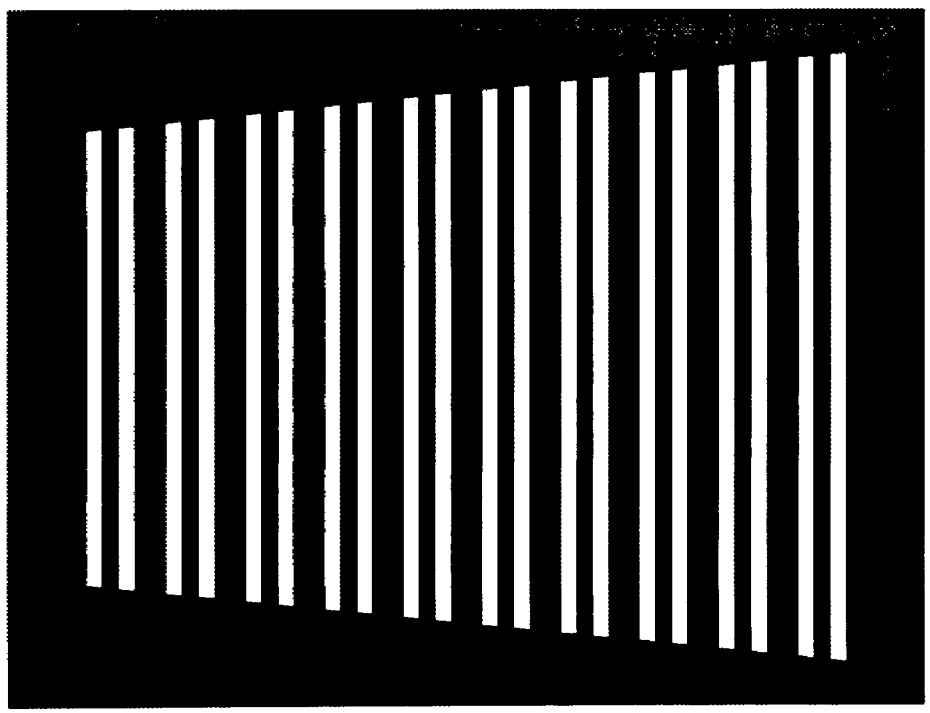
FIG. 5B is an explanatory view showing that lateral trapezoidal distortion is induced in a second projection video for adjustment projected on a screen.

It is herein considered that a projection video for adjustment having a part of the first projection video for adjustment shown in FIG. 5A incorporated therein is drawn in a central horizontal area of the second projection video for adjustment shown in FIG. 5B, and the first angle data $\theta 1$ and the second angle data $\theta 2$ are simultaneously acquired in the projection video for adjustment, for example. In order to realize such a method, however, the first sensor portion 29A must accurately pick up a projection video area for adjustment thereof (make a sensor sight line direction accurate). Similarly, the second sensor portion 29B must accurately pick up a projection video area for adjustment thereof (make a sensor sight line direction accurate). The sensor 29 is attached to the front cover, as described above. The stiffness of the front cover is lower than that of the chassis, so that the sensor sight line direction is liable to be inaccurate. Consequently, situations where each of the sensor portions cannot accurately pick up the projection video area for adjustment thereof are liable to occur. As described above, the first projection video for adjustment utilized for the longitudinal trapezoidal distortion correction and the second projection video for adjustment utilized for the lateral trapezoidal distortion correction are separately (successively) projected, thereby making it possible for each of the sensor portions to accurately pick up the projection video area for adjustment thereof and always accurately generate angle data even if the sensor sight line direction is inaccurate.

The microcomputer 25 calculates, when a first offset value ($\pm\alpha 1$) corresponding to the first angle data $\theta 1$ and a second offset value (±α2) corresponding to the second angle data θ2 are held in a memory (not shown), the corrected angle data by subtracting the offset value from the angle data, for example. Trapezoidal distortion correction is made on the basis of the corrected angle data. The angle and the degree of trapezoidal distortion are in a proportional relationship. If the angle becomes clear, it can be determined what degree of correction should be made with respect to an image. For example, the video signal processing circuit 23 receives the corrected angle data from the microcomputer 25, to perform pixel interpolation/pixel thinning processing of input video data such that an image has trapezoidal distortion whose shape is opposite to that of trapezoidal distortion which is estimated to be produced in projection at an angle represented by the corrected angle data.

At factory shipping of the liquid crystal projector 30, an examination process for storing the offset value in the memory is carried out. For example, the liquid crystal projector 30 is arranged on a stand horizontally set, and there is provided an environment in which a screen is installed so as to be perpendicular to a projection optical axis. That is, the arrangement relationship between the liquid crystal projector 30 and the screen in which no trapezoidal distortion is induced is set. As described above, the first angle data θ1 obtained at the time of projection of the first projection video for adjustment is given as a first offset value (±α1) to the memory, and the second angle data θ2 obtained at the time of projection of the second projection video for adjustment is given as a second offset value (±α2) to the memory.

The above-mentioned methods such as focusing adjustment and trapezoidal distortion correction are not limited. Any method may be used. Although the projection video for adjustment produced in the OSD circuit 28 is an image having a black-and-white area formed therein in order to obtain high contrast, the projection video for adjustment need not be necessarily limited to the image having a black-and-white area formed therein. Further, the image is not limited to a single image. A plurality of images may be prepared. Although the transmission type liquid crystal projector was illustrated as a projection type video display, a reflection type liquid crystal projector may be used. Alternatively, the projection type video display may be not only the liquid crystal projector but also a projection type video display of such a type that a lot of micro mirrors are driven to perform light modulation. Although in the present embodiment, the microcomputer 25 for carrying out overall control in the liquid crystal projector 30 carries out the adjustment control of setting at the time of projection, described above, the projection type video display may be so configured that a microcomputer dedicated to the sensor 29 is provided, to perform processing such as focusing adjustment and angle data calculation in the dedicated microcomputer, and the microcomputer 25 can assign its processing capability for another processing.

As described in the foregoing, according to the present invention, a projection video for adjustment utilized for the focusing adjustment and the trapezoidal distortion correction in image drawing means for drawing an image used as a projection video by itself, thereby eliminating the necessity of external input (an external device) for feeding the projection video for adjustment, to allow such adjustment or the like to be easily and rapidly made. Since the projection video for adjustment for longitudinal trapezoidal distortion correction and the projection video for adjustment for lateral trapezoidal distortion correction are separately (successively) projected, to acquire information respectively required therefor in a sensor, thereby making it possible to realize accurate correction with respect to each of the longitudinal trapezoidal distortion correction and the lateral trapezoidal distortion correction. Further, more accurate correction can be realized by having offset values.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that optically modulates light emitted from a light source by a light valve and projects a video, comprising:
    a sensor comprising image pick-up means for picking up a projection video;
    means for making focusing adjustment on the basis of an output of the sensor;
    means for making trapezoidal distortion correction on the basis of the output of the sensor; and
    image drawing means for drawing an image used as the projection video by itself, wherein
    a projection video for adjustment utilized for the focusing adjustment and the trapezoidal distortion correction is produced by the image drawing means,
    wherein an image having a high contrast area formed therein is drawn as the projection video for adjustment.

2. The projection type video display according to claim 1, wherein said image drawing means is an on-screen display circuit.

3. The projection type video display according to claim 1 or 2, wherein
    said image having a high contrast area formed therein is black and white.

4. A projection type video display that optically modulates light emitted from a light source by a light valve and projects an enlarged video by a projection lens,
    comprising:
    a sensor comprising image pick-up means for picking up a projection video;
    means for making focusing adjustment on the basis of an output of the sensor;
    means for successively producing at least a first projection video for adjustment utilized for longitudinal trapezoidal distortion correction and a second projection video for adjustment utilized for lateral trapezoidal distortion correction;
    means for acquiring first information used for longitudinal trapezoidal distortion correction on the basis of the output of the sensor which is projecting the first projection video for adjustment and acquiring second information used for the lateral trapezoidal distortion correction on the basis of the output of the sensor which is projecting the second projection video for adjustment; and
    means for making trapezoidal distortion correction on the basis of the first information and the second information.

5. The projection type video display according to claim 4, wherein
    the first information is angle information relating to a vertical component of an angle formed at an intersection between a plane perpendicular to a projection optical axis and a projection surface, and
    the second information is angle information relating to a horizontal component of the angle formed at the intersection between the plane perpendicular to the projection optical axis and the projection surface.

6. The projection type video display according to claim 4, wherein
the first projection video for adjustment utilized for the longitudinal trapezoidal distortion correction is a striped video having white horizontal line areas and black horizontal line areas alternately formed therein, and
the second projection video for adjustment utilized for the lateral trapezoidal distortion correction is a striped video having white vertical line areas and black vertical line areas alternately formed therein.

7. The projection type video display according to claim 4, wherein
the sensor is attached to a front cover of the video display, and
the projection lens is attached to a chassis.

8. The projection type video display according to claim 4, further comprising
a memory storing a first offset value for the longitudinal trapezoidal distortion correction and a second offset value for the lateral trapezoidal distortion correction, which are obtained by examination at factory shipping,
adjustment by the offset values being made in making the actual trapezoidal distortion correction.

9. A method of adjusting the projection type video display according to claim 8 at factory shipping, comprising the steps of:
setting the arrangement relationship between the projection type video display and a screen in which no trapezoidal distortion is induced;
storing the first information obtained when the first projection video for adjustment is projected as a first offset value in the memory; and
storing the second information obtained when the second projection video for adjustment is projected as a second offset value in the memory.

* * * * *